May 26, 1953    J. L. ATWOOD    2,639,800
ARTICLE TRANSFER FOR BAKERY CONVEYER SYSTEM
Filed April 27, 1950    4 Sheets-Sheet 1

James L. Atwood
INVENTOR.

May 26, 1953 J. L. ATWOOD 2,639,800
ARTICLE TRANSFER FOR BAKERY CONVEYER SYSTEM
Filed April 27, 1950 4 Sheets-Sheet 2

James L. Atwood
INVENTOR.

May 26, 1953  J. L. ATWOOD  2,639,800
ARTICLE TRANSFER FOR BAKERY CONVEYER SYSTEM
Filed April 27, 1950  4 Sheets-Sheet 3

James L. Atwood
INVENTOR.

May 26, 1953 J. L. ATWOOD 2,639,800
ARTICLE TRANSFER FOR BAKERY CONVEYER SYSTEM
Filed April 27, 1950 4 Sheets-Sheet 4
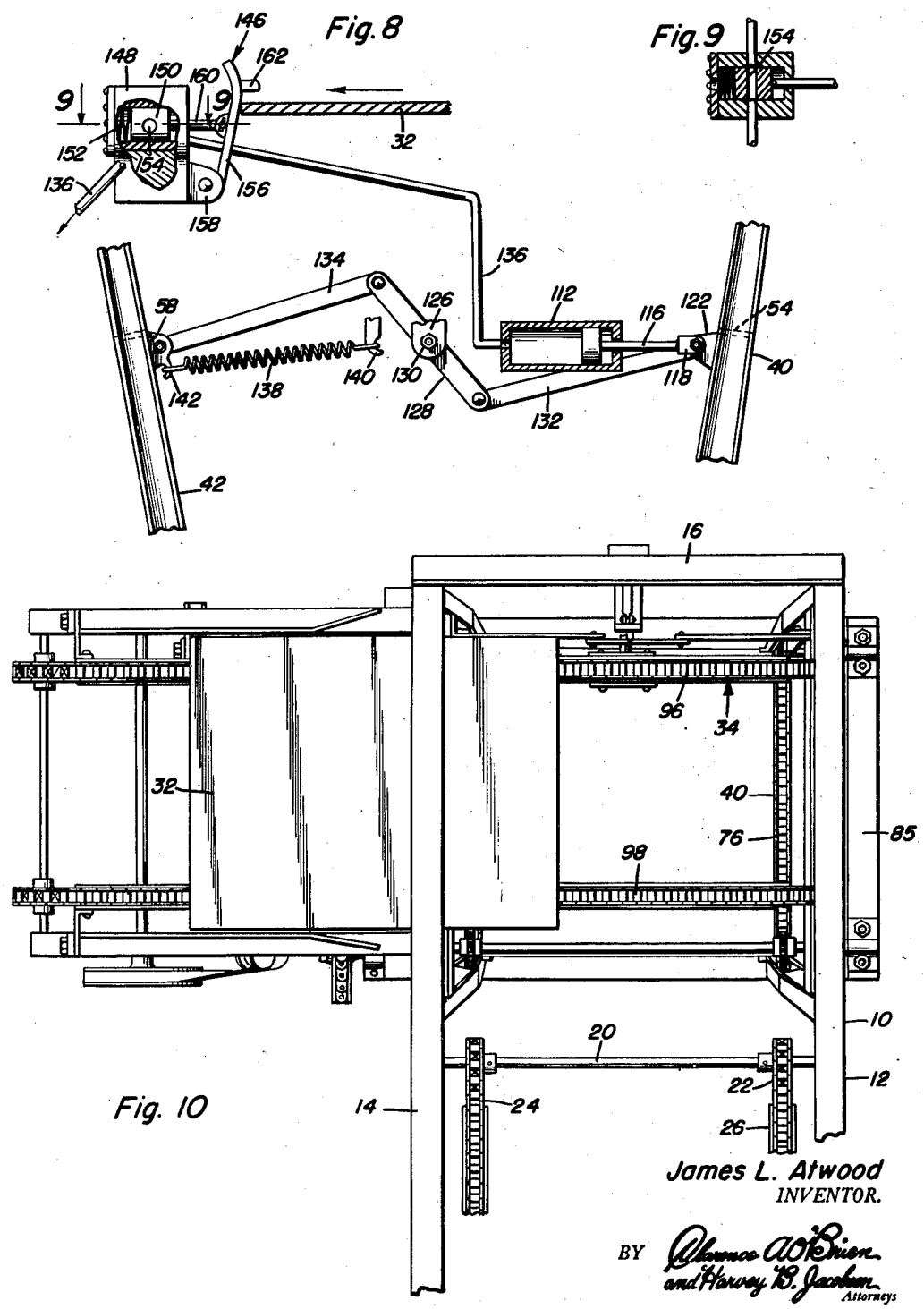
James L. Atwood
INVENTOR.

Patented May 26, 1953

2,639,800

UNITED STATES PATENT OFFICE 2,639,800

ARTICLE TRANSFER FOR BAKERY CONVEYER SYSTEM

James L. Atwood, Nashville, Tenn.

Application April 27, 1950, Serial No. 158,435

5 Claims. (Cl. 198—21)

This invention appertains to a material or article handling apparatus and particularly relates to conveying systems for mechanically moving materials or articles.

The primary object of the instant invention is to transfer articles from a horizontal upper conveyor to a vertically spaced horizontal lower conveyor.

More specifically, an object of this invention is to transfer articles from a horizontal upper conveyor to a lower horizontal conveyor, which is transversely disposed relative to the upper conveyor.

Another important object of this invention is to provide means for transferring articles from a main conveyor to underlying branch conveyors.

Another object of this invention is to provide a rectangular conveying system and to provide transferring means for switching or transferring articles from one side of the conveying system to another side.

Another important object of this invention resides in the reduction of time and labor required in transporting articles from one station to another and in the provision of a conveying system that can be constructed and utilized in a small space.

A meritorious feature of this invention resides in the provision of an upper conveyor, including a pair of spaced rotary parallel sections, and a lower conveyor vertically spaced therefrom and disposed at right angles to the upper conveyor, automatic means being provided for spreading the sections of the upper conveyor to permit the articles carried thereon to gravitate onto the lower conveyor.

Another meritorious feature of this invention resides in the provision of pneumatic operating means for operating a mechanical means to spread the sections of the upper conveyor apart and in the provision of means actuated by the articles moving on the upper conveyor for operating said pneumatic operating means.

These and ancillary objects and structural features of merit are attained by this invention, the preferred embodiment of which is set forth in the following description and illustrated in the accompanying drawings, wherein:

Figure 8 is an enlarged view showing the pneumatic actuation mechanism with parts thereof shown in section for greater clarity;

Figure 9 is a horizontal sectional view as taken along line 9—9 in Figure 8; and Figure 10 is a top plan view showing the device in an opened position.

Figure 1:
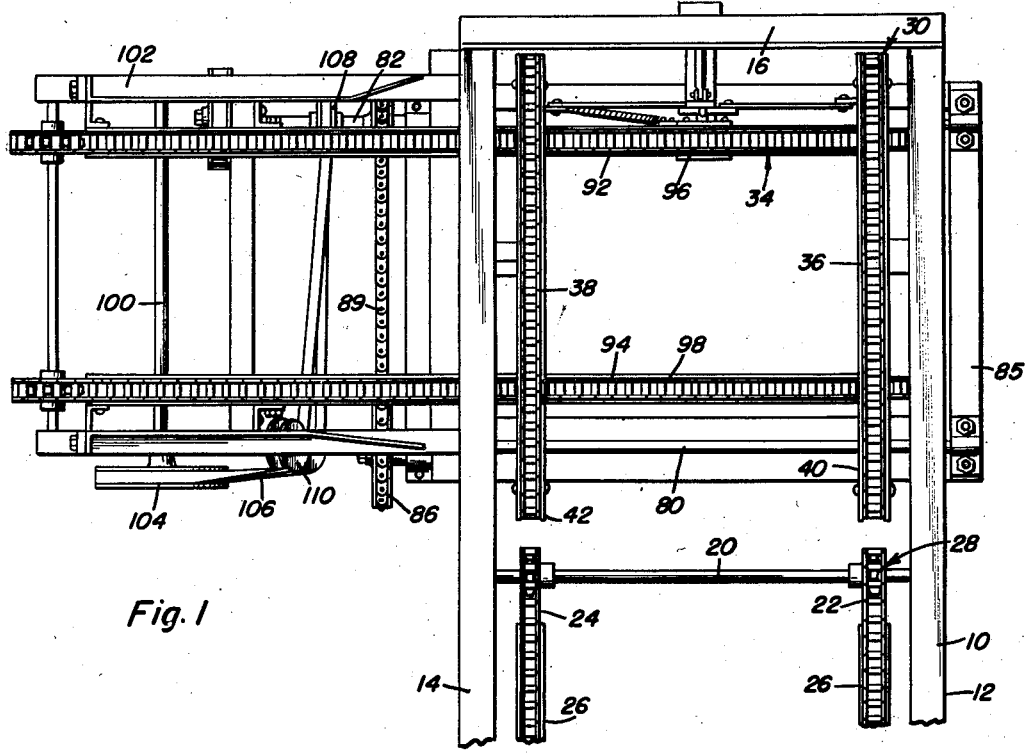
Figure 1 is a plan view.
Figure 2:
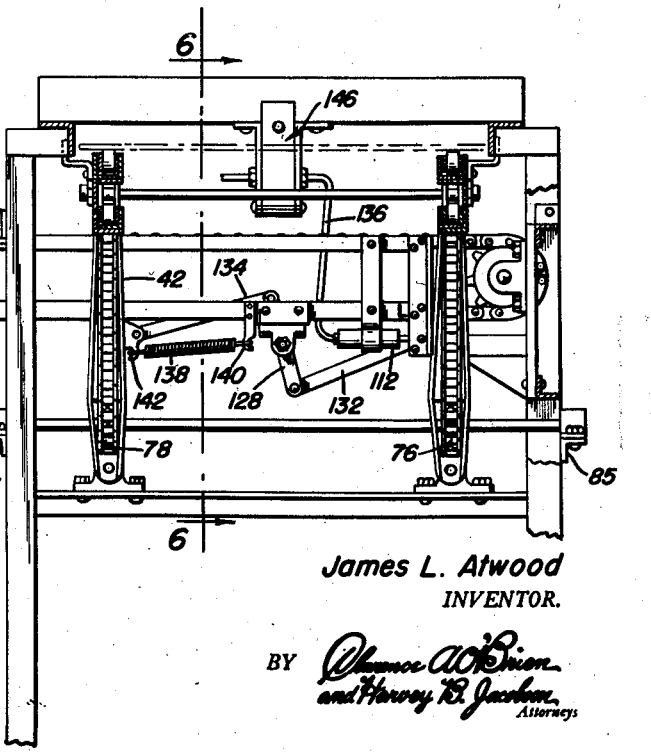
Figure 2 is a longitudinal vertical sectional view, with parts of the apparatus illustrated in elevation.

While the conveying system, illustrated in the accompanying drawings and hereinafter described, may be advantageously employed for conveying any type of materials or articles, it has been especially designed for use in bakeries. Conventionally, pans or sheets, which are loaded with dough, are moved by endless conveyors through tunnel ovens. Heretofore, a long straight tunnel oven had to be provided and the sheets were manually lifted from the loading machine to a conveyor moving through the tunnel oven. After the sheets were carried through the tunnel oven and the dough thereon was baked, it was again necessary to manually move the sheets or pans from the oven conveyor to another conveyor.

The primary aim and purpose of the instant invention is to avoid any manual handling of the sheets or pans and to reduce the amount of space needed to a minimum, so that tunnel ovens may be used in small rooms. Thus a rectangular conveying system is provided and transferring means is provided, whereby the sheets or pans may be automatically transferred from one side of the conveyor system to the other. Thus, the sheets can be automatically conveyed from a starting station at one side of the conveying system to an oven overlying one or more sides of the conveying system and back to the starting station, after passing under an unloading station.

The essence of the invention resides in the transferring means for switching the sheets or pans from an upper horizontal conveyor to a lower transversely disposed horizontal conveyor. The transferring is carried out, without any damage whatsoever to the sheets or pans, which are relatively fragile, and without jarring the dough carried by the sheets the latter functioning to actuate the switch means for controlling the transferring thereof.

Structurally speaking, an elongated rectangular frame 10 is provided and includes a pair of parallel transversely spaced angle irons 12 and 14, forming the sides of the frame, and an angle iron 16 mounted transversely on one of the ends of the side bars. Standards 18 support the frame 10 in an upright horizontal position.

A shaft 20 is transversely journaled below the side bars and spaced longitudinally from the end bar 16 and the ends of parallel rotary chains 22 and 24 are entrained over sprockets mounted on the shaft, the chains being movable in parallel channel-shaped tracks 26. The chains 22 and 24 form the main portion of an upper conveyor 28, with an independent auxiliary end section 30 complementing the main section to form a continuous upper conveyor. The auxiliary section 30 forms the transferring means to permit the sheets or pans 32 (or similar articles or materials) to drop downwardly onto a lower transverse conveyor 34.

Figure 3:
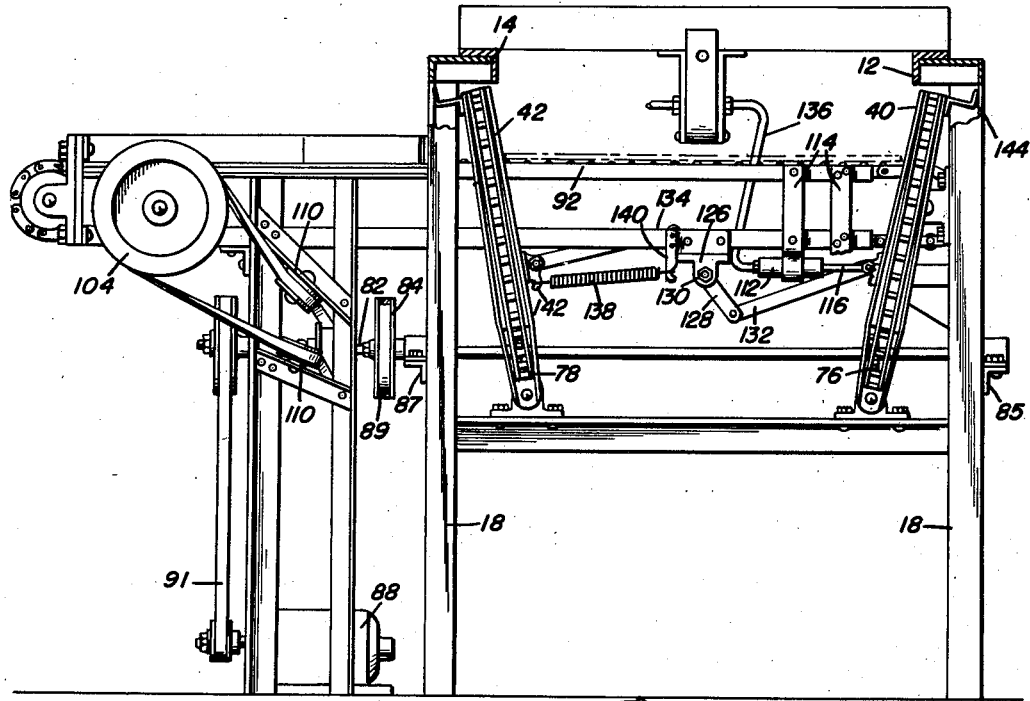
Figure 3 is a longitudinal vertical sectional view, illustrating the sections of the upper conveyor in an open position.

The end section 30 of the upper conveyor includes a pair of complementary transversely spaced parallel sections 36 and 38, which are alignable with the rotary chains 22 and 24, as seen in Figure 1, and which are movable apart into the position, as illustrated in Figures 3 and 10. Upon movement to such latter position, it can be seen that the sheets received from the main section of the upper conveyor and carried by the auxiliary end section will drop down onto the conveyor 34 to be carried thereby in a path of movement at right angles to the movement of the upper conveyor.

Figures 4, 5:
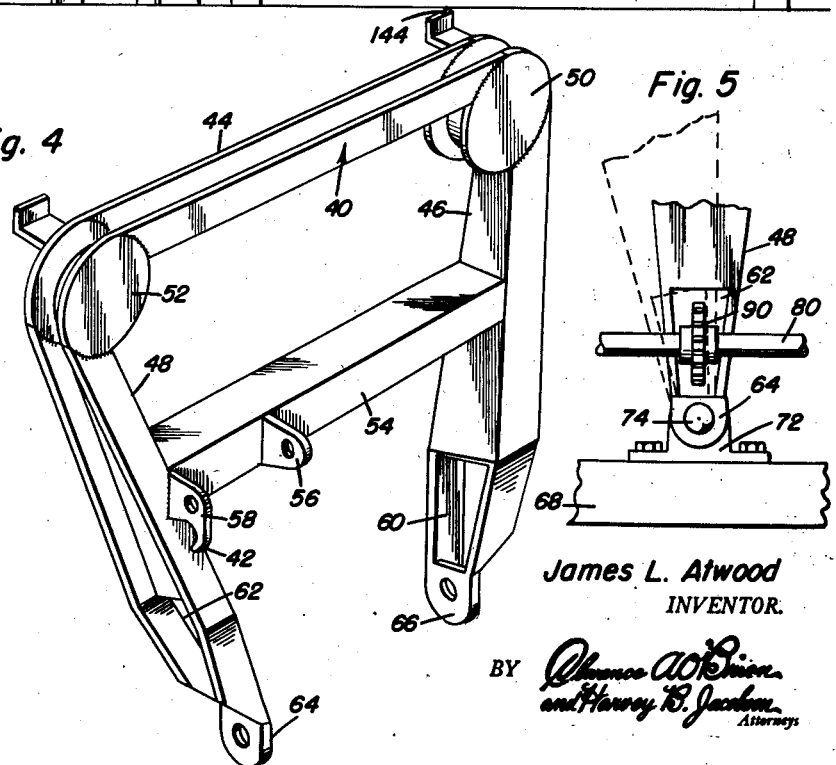
Figure 4 is a view in perspective of the supporting member for the sections of the upper conveyor.
Figure 5 is a fragmentary elevational view of the journal end of the support for the sections of the upper conveyor.

Both of the sections 36 and 38 of the auxiliary end section of the upper conveyor include supporting members 40 and 42, one of which is illustrated in detail in Figure 4. As seen therein, the supporting member 40 is substantially U-shaped and includes a web section 44 and depending legs 46 and 48 which converge inwardly relative to each other at their outer free ends. The web section and the legs are formed from channel bars and are secured together by means of pulleys 50 and 52, the pulleys being welded to the ends of the web sections and to the legs. A transverse channel bar 54 is welded to the legs and apertured ears 56 and 58 project laterally therefrom, for a purpose to be described. The lower ends of the legs are formed with cut-out portions 60 and 62 and the legs terminate in apertured bearing ears 64 and 66.

Figure 6:
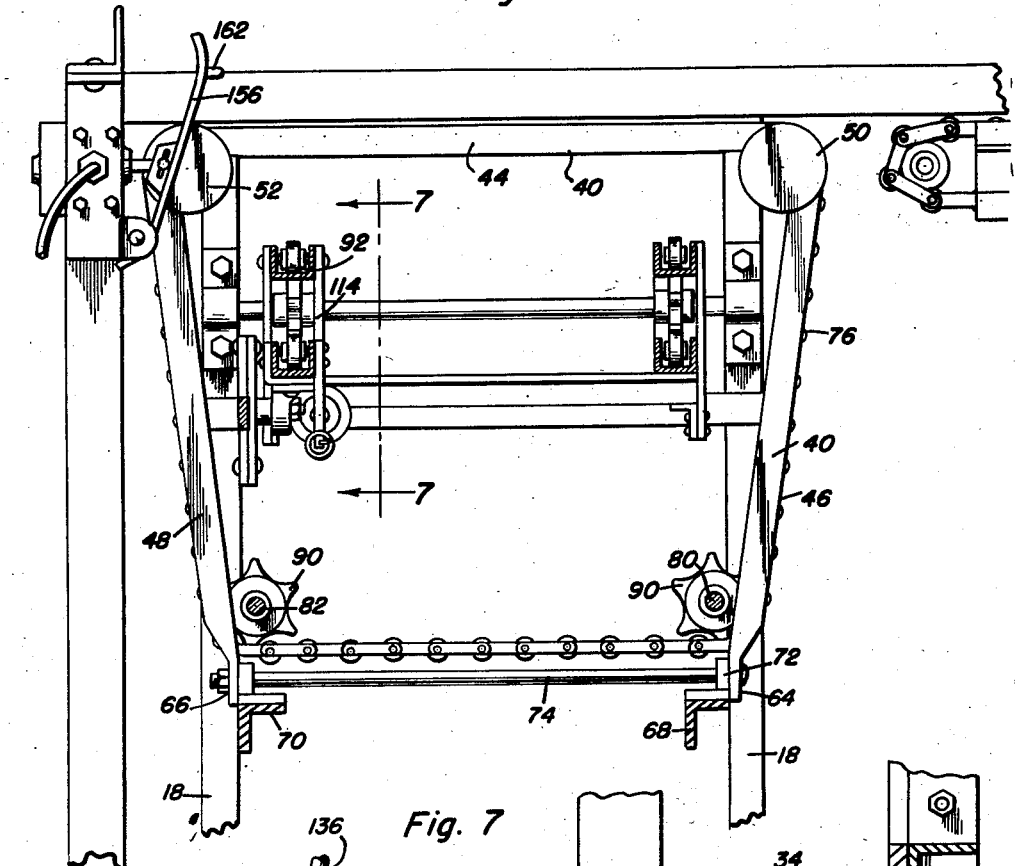
Figure 6 is a transverse sectional view taken on the line 6—6 of Figure 2.
Figure 7:
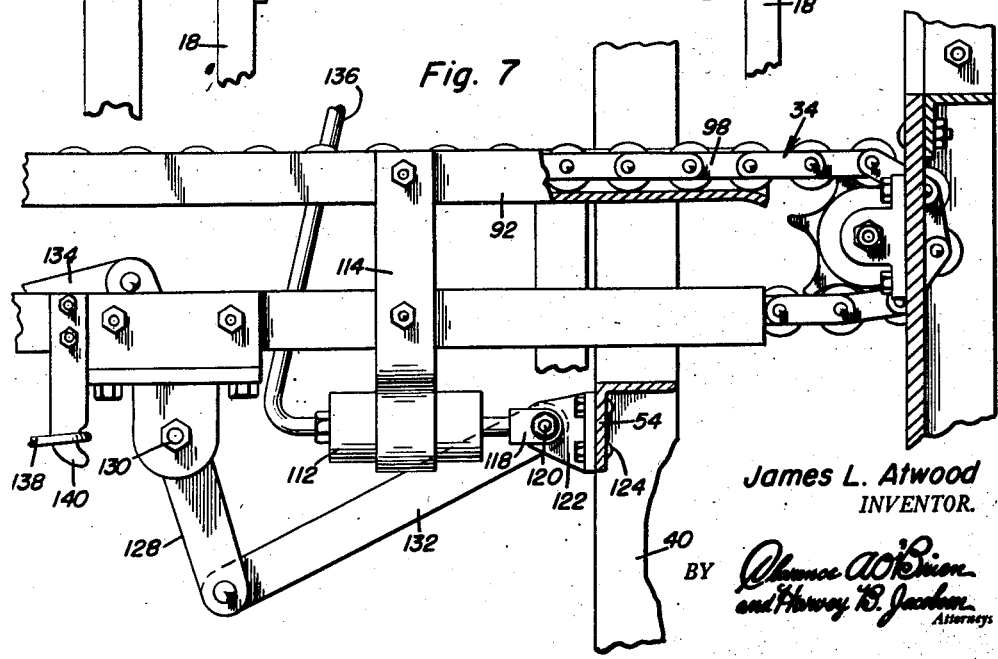
Figure 7 is an enlarged fragmentary sectional view taken on the line 7—7 of Figure 6.

As seen in Figure 6, angle irons 68 and 70 are mounted transversely between the supporting standards 18 and bearing blocks 72 are carried thereby, the bearing blocks receiving shafts 74 which are secured to the bearing ears 64 and 66 of the supporting members 42 and 40. Thus, the supporting members are pivotally mounted on the supporting angle irons 68 and 70 by means of the shafts 74 and are vertically swingable about the shafts and the pivot. Endless chains or similar members 76 and 78 are rotatably disposed in the supporting members, the chains extending through the openings 60 and 62 in each of the supporting members, the supporting members forming tracks for the chains.

Means is provided for rotating the rotary chains 76 and 78 and includes a pair of parallel shafts 80 and 82, which extend transversely between the supporting members 40 and 42, the shafts being journaled in bearings mounted on supporting bars 85 and 87, which are secured to the standards 18. A prime mover 88 is provided and is preferably mounted on the supporting surface for the standards. The prime mover is connected by a belt drive 91 to the shaft 82 and pulleys 84 and 86 are secured on the two shafts, the pulleys being connected by a chain 89. Sprockets 90 are disposed on the shafts as seen in Figure 5 and are disposed through the openings 60 and 62 in the legs of the supporting members or tracks for engagement with the rotary chains.

The lower conveyor 34 includes a pair of supporting tracks 92 and 94 on which rotary chains 96 and 98 are positioned for endless rotary movement, the chains being driven by sprocket wheels carried by transverse shafts 100 which is journaled in a supporting frame 102 for the chains and tracks. A pulley 104 is fixed on the extending end of the shaft and a belt 106 is driven by the shaft 82, the belt being disposed on the pulley 104 and on a pulley 108 fixed on the shaft 82. Idler pulleys 110 are provided, as seen in Figures 1 and 3.

Means is provided for spreading the supporting members apart, so that articles conveyed by the chains 76 and 78 may be dropped onto the lower conveyor 34. The means includes a small pneumatic cylinder 112, which is suspended by a bracket 114 from the track 92 and which is provided with a piston workably mounted therein and having a customary piston rod 116. The piston rod terminates in a clevis end 118 which is pivotally mounted by a pivot pin 120 to the projecting flange of an angle iron 122. The angle iron is bolted as at 124 to the transverse bar 54 of one of the supporting members.

A bearing block 126 is carried by the lower section of the supporting track 92 and a vertical bar 128 is centrally pivoted by a pin 130 thereto. Links 132 and 134 are pivoted at their inner ends to the opposing terminals of the bar 128 and are pivotally secured at their outer ends between the ears and a cross bar of each of the supporting members. Thus, as the piston is forced outwardly in the cylinder by pneumatic pressure admitted to the cylinder by a pneumatic line 136, the supporting member 40 is swung outwardly and, at the same time, the outward swinging movement of the supporting member 40 results in an outward movement of the link 132 to effect an outward swinging movement to the bar 128 and the link 134, of the companion supporting member 42. The supporting members are, therefore, simultaneously spread apart by means of the pistons.

A spring 138 is secured at one end to a depending finger 140 which extends to the lower section of the track 92 and to a finger 142 formed on the cross bar 54 of the supporting member 42. The spring functions to normally retain the supporting members in proper transversely spaced relationship and to urge the supporting members to their normal positions, upon release of pneumatic pressure controlling the outward stroke of the piston rod. To limit the inward movement of the supporting members relative to each other, angular stop pins 144 are carried by the upper ends of the supporting members and are adapted to contact or abut the vertical flanges of the side bars 12 and 14 of the frame 10.

Switch means is interposed in the pneumatic line 136 and controls the actuation of the piston to the cylinder 112, the switch means being actuated by the lead edge of the cooking sheets 32 or similar articles, and the articles are moved by the chains 76 and 78 on the supporting members. Thus, as seen in Figure 10, the cooking sheets are moved on the chains 22 and 24 toward the end 16 of the frame 10. The sheets are continued in their movement by the chains 76 and 78 until the lead edge of the sheets contact a switch means 146, disposed at the end of the frame. Upon actuation of the switch means by the sheets, the piston rod is moved outwardly in the cylinder and the supporting members or tracks are spread apart to permit the sheets to drop downwardly onto the lower conveyor 34. It is to be noted that the sheets are moved by the upper conveyor by the auxiliary end section thereof in a path of movement transverse to the longitudinal axis of the sheets, so that when the sheets drop downwardly onto the lower conveyor and are moved outwardly from the frame 10 thereby, the sheets move parallel to their longitudinal axes.

The switch means 146 includes a housing 148 carried by the end bar 16 and interposed in the line 136, the line communicating the cylinder with a conventional pump. A valve block 150 is slidably mounted in the housing and a spring 152 is positioned between one end of the housing and the inner end of the block to normally urge the same outwardly. A transverse passage 154 is formed in the block and provides communication between the two sections of the line entering and leaving the housing. A plate 156 is pivotally journaled at its lower end between a pair of lateral ears 158, the ears projecting from the lower end of the housing and the plate is pivotally secured to the outer terminal of the stem 160 associated with the block 150 and slidably disposed through the inner end of the housing. A stud 162 projects outwardly from the inner face of the plate 156 and, as seen in Figure 8, the plate is contacted by the lead edge of the sheets 32 (or similar articles) to urge the block 150 inwardly, whereby the transverse passage 154 therein is communicated with the line to establish a communication between the pump and the cylinder.

Thus, it can be seen that the sheets or similar articles are automatically transferred from an upper conveyor to a lower conveyor, the lower conveyor being disposed at right angles to the upper conveyor. In actual use, it has been found that the automatic conveyors and transferring means provided herein reduces to a minimum the labor attendant with baking cookies or similar pastries in tunnel type ovens. Production costs are considerably lower and a considerable saving in time is realized. Because of the simplicity and compactness of the transferring means, no attendant is required and no expensive complicated timing nor actuating mechanism is needed.

Having described the invention, what is claimed as new is:

1. In combination, a horizontal article conveyor having a discharge end, a horizontal cross conveyor spaced outwardly from said discharge end below the same, a transfer conveyor at said discharge end of the first named conveyor for receiving articles therefrom, said transfer conveyor comprising a pair of endless driven chains extending around said cross conveyor transversely thereof, and a pair of frames supporting said chains in laterally spaced parallel relation with upper transfer runs traversing the cross conveyor above the same, said frames being pivotally mounted for swinging apart longitudinally of said cross conveyor to correspondingly swing said upper runs for dumping articles therefrom on to the cross conveyor, and means for swinging said frames.

2. The combination according to claim 1 wherein said means includes a pneumatically operated piston for swinging one of said frames away from the other, and a toggle connecting said frames for swinging the other frame away from the first named frame by said swinging of said first named frame.

3. The combination according to claim 1, said frames swinging said upper runs into and out of coplanar relation and longitudinal alignment with respect to said first mentioned conveyor.

4. The combination according to claim 1, said frames being U-shaped and straddling said cross conveyor with channel webs traversing said cross conveyor above the same and guidingly supporting said upper runs.

5. The combination according to claim 1, said frames being pivotally mounted at one end of the first named conveyor and swingable toward each other to swing said upper runs toward each other into coplanar relation and longitudinal alignment with respect to said first named conveyor so that said upper runs form a continuation of said first named conveyor.

JAMES L. ATWOOD.

References Cited in the file of this patent

UNITED STATES PATENTS

| Number | Name | Date |
| --- | --- | --- |
| 1,593,319 | Tytus | July 20, 1926 |
| 1,688,219 | Williams | Oct. 16, 1928 |
| 1,840,370 | Ryan et al. | Jan. 12, 1932 |
| 1,951,178 | Smitmans | Mar. 13, 1934 |
| 2,273,689 | Boron et al. | Feb. 17, 1942 |
| 2,315,003 | Martin et al. | Mar. 30, 1943 |